US011765333B1

(12) United States Patent
Mhatre et al.

(10) Patent No.: US 11,765,333 B1
(45) Date of Patent: Sep. 19, 2023

(54) SYSTEMS AND METHODS FOR IMPROVED TRANSITIONS IN IMMERSIVE MEDIA

(71) Applicant: Apple Inc., Cupertino, CA (US)

(72) Inventors: Ameya Arun Mhatre, San Francisco, CA (US); Matthew Thomas Fargo, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/453,156

(22) Filed: Nov. 1, 2021

Related U.S. Application Data

(60) Provisional application No. 63/126,399, filed on Dec. 16, 2020.

(51) Int. Cl.
*H04N 13/117* (2018.01)
*H04N 13/167* (2018.01)

(52) U.S. Cl.
CPC ......... *H04N 13/117* (2018.05); *H04N 13/167* (2018.05)

(58) Field of Classification Search
CPC ........................... H04N 13/117; H04N 13/167
USPC .......................................................... 348/51
See application file for complete search history.

(56) References Cited

U.S. PATENT DOCUMENTS

| | | | | |
|---|---|---|---|---|
| 5,053,760 | A * | 10/1991 | Frasier | G06T 13/00 345/440.1 |
| 5,268,677 | A * | 12/1993 | Frasier | G06T 15/30 345/623 |
| 9,734,615 | B1 * | 8/2017 | Knoll | G06T 13/20 |
| 10,687,039 | B1 * | 6/2020 | Vaden | H04N 5/23258 |
| 2014/0164636 | A1 * | 6/2014 | Silvestri | H04N 21/85 709/231 |
| 2014/0293020 | A1 * | 10/2014 | Uehara | H04N 13/376 348/51 |
| 2018/0227569 | A1 * | 8/2018 | Holzer | H04N 13/117 |
| 2018/0255290 | A1 * | 9/2018 | Holzer | H04N 13/221 |
| 2019/0132569 | A1 * | 5/2019 | Karpenko | G06F 3/04886 |
| 2019/0238609 | A1 * | 8/2019 | Skupin | H04N 21/23439 |
| 2019/0278434 | A1 * | 9/2019 | Holzer | G06V 20/10 |

(Continued)

OTHER PUBLICATIONS

"Final Cut Pro & 360° spherical video—All you need to know," Web page < https://alex4d.com/vr-video-guides/item/final-cut-pro>, 21 pages, Sep. 10, 2018, retrieved from Internet Archive Wayback Machine <https://web.archive.org/web/20180910210738/https://alex4d.com/vr-video-guides/item/final-cut-pro> on Nov. 2, 2021.

(Continued)

*Primary Examiner* — Tung T Vo
(74) *Attorney, Agent, or Firm* — Kubota & Basol LLP

(57) ABSTRACT

An immersive video experience can include a path between a plurality of keyframes selected by the filmmaker. A viewer can be given control of the view in the immersive video experience to provide the viewer freedom to look around and explore the scene. To improve user experience, after the user adjusts the perspective of the immersive video to depart from a filmmaker's defined perspective, the perspective can be returned to resume the filmmaker's defined perspective to avoid the viewer missing important parts of the immersive video. Additionally, the user experience can be improved by having the return from the user-adjusted perspective to the filmmaker's defined perspective include a visually pleasing transition that does not require further user input.

25 Claims, 6 Drawing Sheets

(56) References Cited

U.S. PATENT DOCUMENTS

| | | | |
|---|---|---|---|
| 2020/0107004 A1* | 4/2020 | Hayashi | G06T 7/90 |
| 2020/0145635 A1* | 5/2020 | Yoneda | G06F 3/011 |
| 2020/0275083 A1* | 8/2020 | Yoneda | H04N 21/4728 |
| 2021/0021806 A1* | 1/2021 | He | H04N 21/21805 |
| 2021/0312702 A1* | 10/2021 | Holzer | G06T 15/205 |
| 2021/0358131 A1* | 11/2021 | Chung | H04N 13/332 |
| 2021/0360220 A1* | 11/2021 | Chung | H04N 13/383 |
| 2022/0006995 A1* | 1/2022 | Sakakima | H04N 5/232 |

OTHER PUBLICATIONS

"Reorient 360° media in Motion," Motion User Guide (version 5.4.6) [online]. Apple Inc., Aug. 25, 2020 [retrieved on Nov. 2, 2021]. Retrieved from the Internet: < https://support.apple.com/en-sa/guide/motion/motn90d0d6a9/5.4.6/mac/10.14.6>.

\* cited by examiner

SYSTEMS AND METHODS FOR IMPROVED TRANSITIONS IN IMMERSIVE MEDIA

CROSS-REFERENCE TO RELATED APPLICATIONS

This application claims the benefit of U.S. Provisional Application No. 63/126,399, filed Dec. 16, 2020, the content of which is incorporated herein by reference in its entirety for all purposes.

FIELD OF THE DISCLOSURE

This disclosure relates generally to improved transitions in immersive media, and more particularly to improved transitions returning back from a viewer-adjusted view of immersive media back to a predetermined view of the immersive media.

BACKGROUND OF THE DISCLOSURE

Multiple cameras can be used to capture 360-degree (360°) video. For example, multiple overlapping fields of view can be stitched together in a rectangular frame as an equirectangular projection. Thus, 360° video can provide a panoramic video that is often referred to herein as scene. In some examples, the viewer of such 360° video can experience the scene from the predetermined perspective selected by a filmmaker (e.g., from the viewing angles, zoom level, etc. of the camera as selected by the filmmaker). In some examples, a viewer (user) can adjust the view of the scene with user input. For example, a rectangular window of the 360° video can be provided using an electronic device (e.g., smartphone, tablet, laptop computer, head mounted display, etc.) that can allow the viewer to scroll the window to see different parts of the scene. In some examples, the scrolling of the window can be controlled by the viewer based on motion of the electronic device or via other viewer inputs (e.g., using a touch screen or other input devices of the electronic device). Viewer control of the view of the scene, however, can depart from the predetermined perspective of the filmmaker that may degrade the viewer experience (user experience). For example, a viewer may miss important aspects of the 360° video because the viewer-adjusted window may be directed away from the window required to view the important aspects of the 360° video. Additionally, further user input may be required to return the view to the predetermined perspective selected by the filmmaker.

SUMMARY

An immersive video experience can include a path between a plurality of keyframes selected by the filmmaker (e.g., the path defining a sequence of transitions between keyframes). The path may be referred to herein as a "filmmaker's path" or "directors path" and can define the filmmaker's perspective of the scene. A viewer can be given control of the view in the immersive video experience to provide the viewer freedom to look around and explore the scene. To improve user experience, after the user adjusts the perspective of the immersive video to depart from a filmmaker's defined perspective (e.g., by manually adjusting the orientation and/or zoom level of the viewport), the perspective can be returned to resume the filmmaker's defined perspective to avoid the viewer missing important parts of the immersive video. Additionally, the user experience can be improved by having the return from the user-adjusted perspective to the filmmaker's defined perspective include a visually pleasing transition that does not require further user input (e.g., automatic return).

DETAILED DESCRIPTION

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

Described herein are systems and methods for improved transitions in immersive media. For example, an immersive video experience can include path between a plurality of keyframes selected by the filmmaker (e.g., the path defining a sequence of transitions between keyframes). The path may be referred to herein as a "filmmaker's path" or "directors path" and can define the filmmaker's perspective of the scene. A viewer can be given control of the view in the immersive video experience to provide the viewer freedom to look around and explore the scene. To improve user experience, after the user adjusts the perspective of the immersive video to depart from a filmmaker's defined perspective (e.g., by manually adjusting the orientation and/or zoom level of the viewport), the perspective can be returned to resume the filmmaker's defined perspective to avoid the viewer missing important parts of the immersive video. Additionally, the user experience can be improved by having the return from the user-adjusted perspective to the filmmaker's defined perspective include a visually pleasing transition that does not require further user input (e.g., automatic return).

Figure 1A:
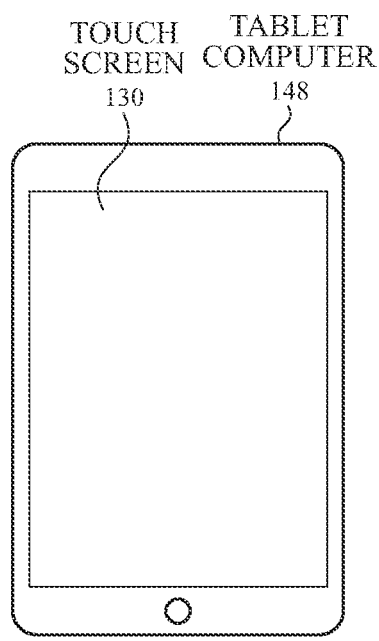
FIGS. 1A-1B illustrate exemplary systems, optionally including touch screens, that can provide improved transitions for immersive media according to examples of the disclosure.
Figure 1B:
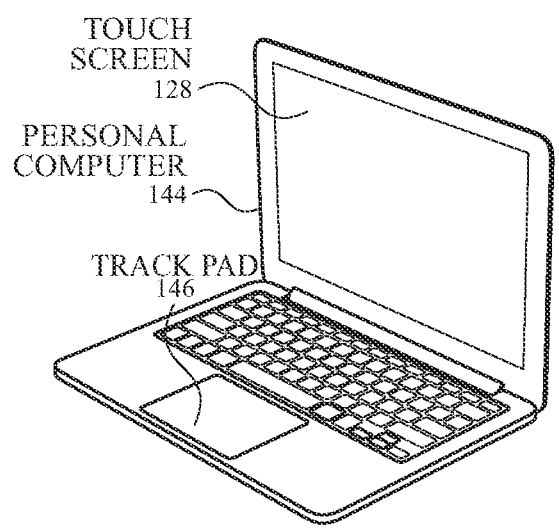

FIGS. 1A-1B illustrate exemplary devices, optionally including touch screens, that can provide improved transitions for immersive media (e.g., 360° video) according to examples of the disclosure. FIG. 1A illustrates an example tablet computing device 148 (or mobile telephone or digital media player) that includes a touch screen 130 and can provide improved transitions for immersive media according to examples of the disclosure. FIG. 1B illustrates an example personal computer 144 that includes a touch screen 128 and a track pad 146, and can provide improved transitions for immersive media according to examples of the disclosure. It should be understood that the exemplary devices illustrated in FIGS. 1A-1B are provided by way of example, and other types of devices can provide improved transitions for immersive media described herein (e.g., a wearable device, desktop computer, etc.). Additionally, although the devices illustrated in FIGS. 1A-1B include touch screens, in some examples, the devices may have a non-touch-sensitive display or other display generation component(s) and may include other input devices than touch-sensitive surfaces (e.g., button, switches, motion sensors, etc.).

Figure 2:
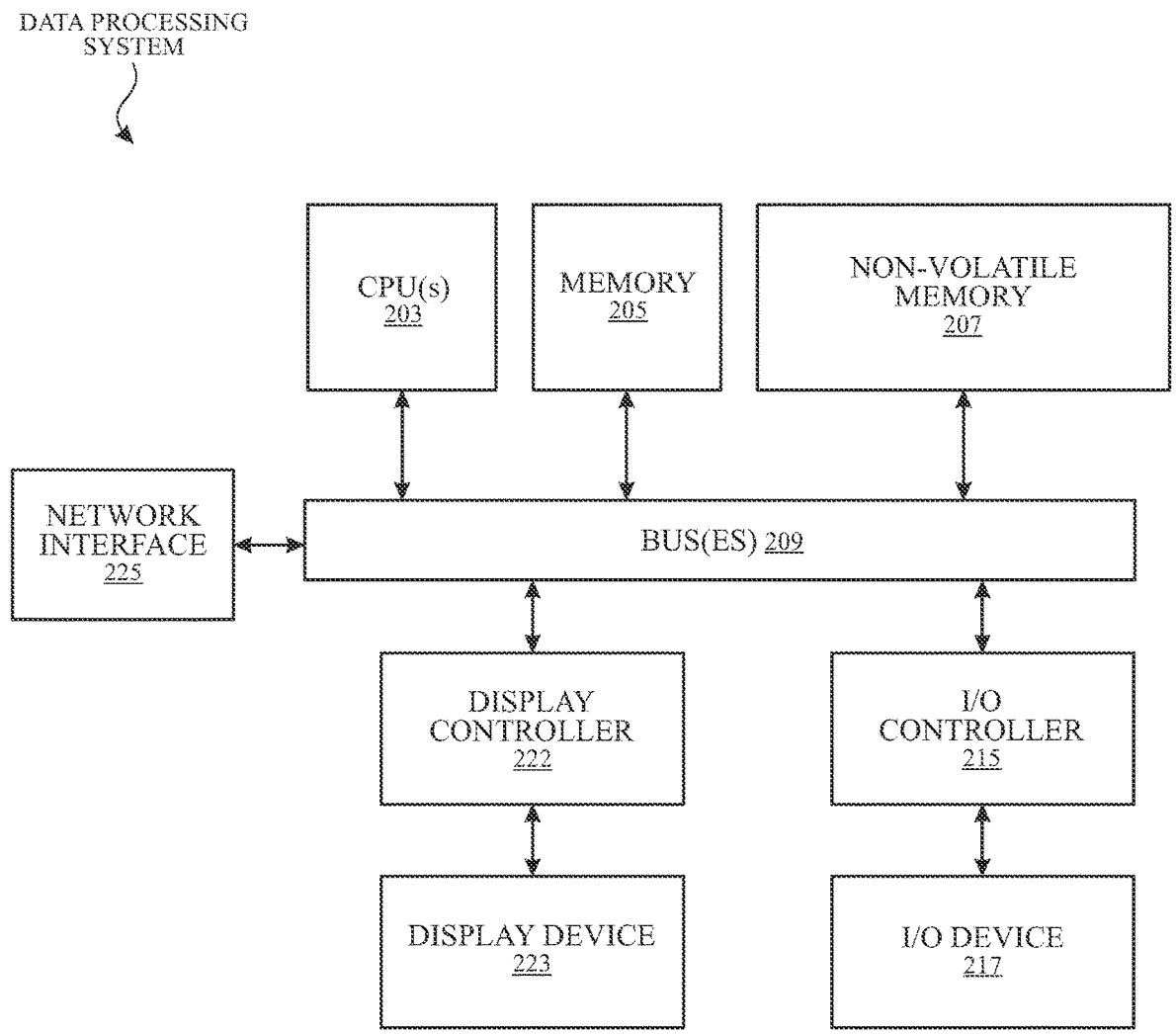
FIG. 2 illustrates a block diagram of an exemplary data processing system according to examples of the disclosure.

A data processing system can control the operations of a device (e.g., tablet computing device 148, personal computer 144, mobile telephone, digital media player, etc.). FIG. 2 illustrates a block diagram of an exemplary data processing system according to examples of the disclosure. The data processing system 200 can include one or more buses 209, which serve to interconnect the various components of the system. One or more central processing units (CPUs) 203, which may include one or multiple cores (e.g., an efficiency core and a processing core) and one or more memory management units, can be coupled to the one or more buses 209.

The data processing system 200 can include memory 205 that can include any type of memory including, but not limited to, volatile sequential DRAM, nonvolatile RAM, flash memory, phase change memory, or other types of volatile or nonvolatile semiconductor memory. The data processing system 200 can also include non-volatile memory 207, where data may be maintained after all power is removed from the data processing system 200. Exemplary nonvolatile memory 207 can include, but is not limited to, a hard disk drive, flash memory, a magnetic optical drive, magnetic memory, or an optical drive. Memory 205 and nonvolatile memory 207 can couple to the one or more buses 209 using one or more interfaces and connections.

The data processing system 200 can include one or more display controllers that can provide data to be displayed on one or more display devices. For example, FIG. 2 illustrates a display controller 222 that can be coupled to the bus(es) 209 to receive data to be displayed on a display device 223. The data can be immersive media such as 360° video. In some examples, the data can be a portion of a 360° video determined using a window/viewport to select a portion of the scene.

The data processing system 200 can also include one or more input/output (I/O) controllers 215 that can provide interfaces for one or more I/O devices 217. The I/O device(s) can provide input and/or output for the electronic device. Exemplary I/O devices 217 can include mice, touch screens, track pads, joysticks, styli, microphones, cameras, motion sensors (e.g., accelerometers, gyroscopes, inertial measurement units) and other types of input devices. In some examples, the one or more I/O devices can include input devices to detect user input to adjust the window/viewport for the 360° video. In some examples, the display controller 222 and a touch controller (e.g., I/O controller 215) can be integrated or otherwise operated together for controlling a touch screen (e.g., touch screens illustrated in FIGS. 1A-1B). Additionally, one or more network interfaces 225 can couple to the bus(es) 209 to provide access to one or more networks (not shown).

CPU(s) 203 can receive inputs from I/O devices 217 and perform actions based on the inputs. For example, communication between CPU 203 and a touch screen (e.g., display device 223 and I/O device 217) can be used to generate an image on the touch screen, such as an image of a user interface (UI), and can use the touch screen and/or its touch controller (e.g., I/O controller 215) to detect a touch on or near the touch screen, such as a touch input and/or force input to the displayed UI. The touch input can be used by computer programs stored in memory 205 and/or non-volatile memory 207 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. In some examples, as described herein, the user input can be used by computer programs executed by the one or more processors (e.g., CPU(s) 203) to adjust the window/viewport for 360° video. Additionally or alternatively, the computer programs executed by the one or more processors can be used to transition from the user-adjusted window/viewport back to a predetermined window/viewport (e.g., a filmmaker's perspective). It should be understood that the disclosure herein is not limited to a touch screen or touch input on a touch screen and can be applied to other display generation component(s) and/or input device(s).

Note that one or more of the functions described herein can be performed by executed by CPU(s) 203 from instructions stored in program storage (e.g., memory 205 and/or non-volatile memory 207). The instructions can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

It is to be understood that data processing system 200 is not limited to the components and configuration of FIG. 2, but can include other or additional components in multiple configurations according to various examples. Additionally, the components of data processing system 200 can be included within a single device, or can be distributed between multiple devices. Additionally, it should be understood that the connections between the components is exemplary and different unidirectional or bidirectional connections can be included between the components depending on the implementation, irrespective of the arrows shown in the configuration of FIG. 2.

As described herein, a filmmaker can create an immersive 360° video experience, in which the filmmaker selects the perspective (e.g., viewing angle, zoom level, etc.) of the scene. For example, the filmmaker can define an orientation of a camera viewport (or window) and/or define a zoom level of the camera viewport. The orientation of the camera viewport can include the position and direction of the camera viewport with respect the scene. In some examples, the orientation of the camera viewport and/or the zoom level of the camera viewport can be defined using a keyframe. The perspective can be changed during the course of the immersive 360° video experience in a sequence defined by the filmmaker. For example, an immersive video experience can include a sequence of transitions, a path, between a plurality of keyframes selected by the filmmaker. Each keyframe can be associated with timing information and orientation information defining an orientation of a viewport for the immersive video at a given time within the immersive video. Additionally, each keyframe can optionally be associated with zoom information defining an amount of zoom of a viewport for the immersive video at a given time within the immersive video.

In some examples, the transition between two keyframes (a pair of keyframes) can be defined by the filmmaker's path. In some examples, the transition can be an interpolation of the orientation and/or the zoom level between two keyframes. In some examples, the interpolation can be a linear interpolation (e.g., a spherical linear interpolation). In some examples, a quadratic easing function can be used to interpolate between two keyframes (e.g., a second order quadratic easing function, a third order quadratic easing function, etc.). In some examples, a first interpolation can be used for orientation and second, different interpolation can be used for zoom. For example, a second order quadratic easing function can be used for orientation and a linear interpolation can be used for zoom level. It should be understood that orientation and zoom are two characteristics of the viewport that can be defined using keyframes, but other characteristics can be used additionally or alternatively. Additionally, it should be understood that other types of transitions than linear interpolations or quadratic easing functions are possible between two keyframes.

Additionally, as described herein, a viewer of an immersive 360° video experience can adjust the orientation of a camera viewport using user input. For example, the user input can include motion and/or orientation changes of an electronic device (e.g., as measured by accelerometers, gyroscopes or other IMUs), gestures on a touch screen, or using other controls (e.g., sliders, buttons, etc.), among other possibilities. Viewer control of the view of the scene provides some freedom to look around and explore the scene. However, viewer control of the view of the scene may degrade the user experience of a viewer. For example, after user input changes the orientation and/or zoom of the viewport in the 360° video, the user may be required to navigate manually in the immersive video experience to reorient and/or resize the viewport to return to following the filmmaker's perspective for the immersive experience in accordance with the filmmaker's path. For example, a viewer may need to use user input (e.g., mouse or button presses, single or multi-finger gestures, moving the electronic device, etc.) to pan, rotate and/or zoom the viewport of the camera. However, these manual inputs may not provide a visually pleasing experience and/or may disorient a user. Additionally, when the user adjusts the orientation and/or zoom of the viewport away from the filmmaker's designated perspective, the viewer may miss important aspects of the 360° video because the viewer-adjusted window may be directed away from the window required to view the important aspects of the 360° video and/or the audio accompanying the video may be disconnected from the intended visual provided by the video (e.g., a narrator may be speaking about an object that is not in the field of view in the viewer-adjusted window).

In some examples, to improve user experience, after the user manually adjusts the perspective of the immersive video to depart from the filmmaker's defined perspective (e.g., by manually adjusting the orientation and/or zoom level of the viewport), the perspective can be returned to resume the filmmaker's defined perspective to avoid missing important parts of the immersive video. Additionally, the user experience can be improved by having the return from the user-adjusted perspective to the filmmaker's defined perspective include a visually pleasant transition that does not require further user input (e.g., automatic).

Figure 3A:
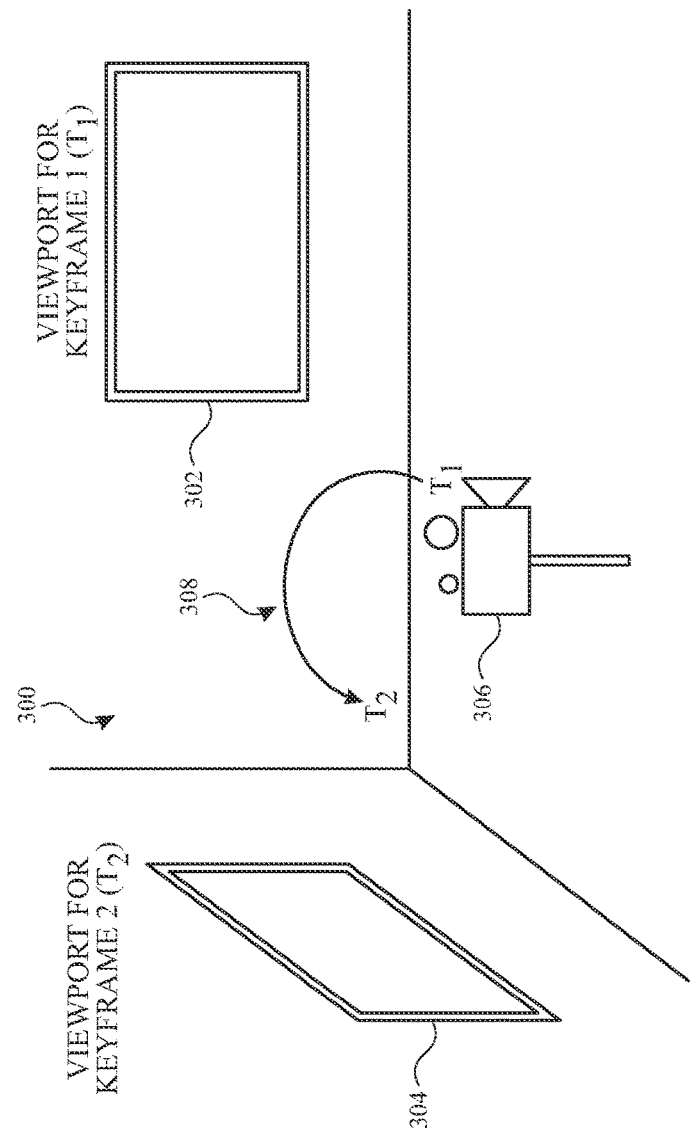
FIGS. 3A-3B illustrate a transition between a first keyframe and a second keyframe of a sequence of keyframes according to examples of the disclosure.
Figure 3B:
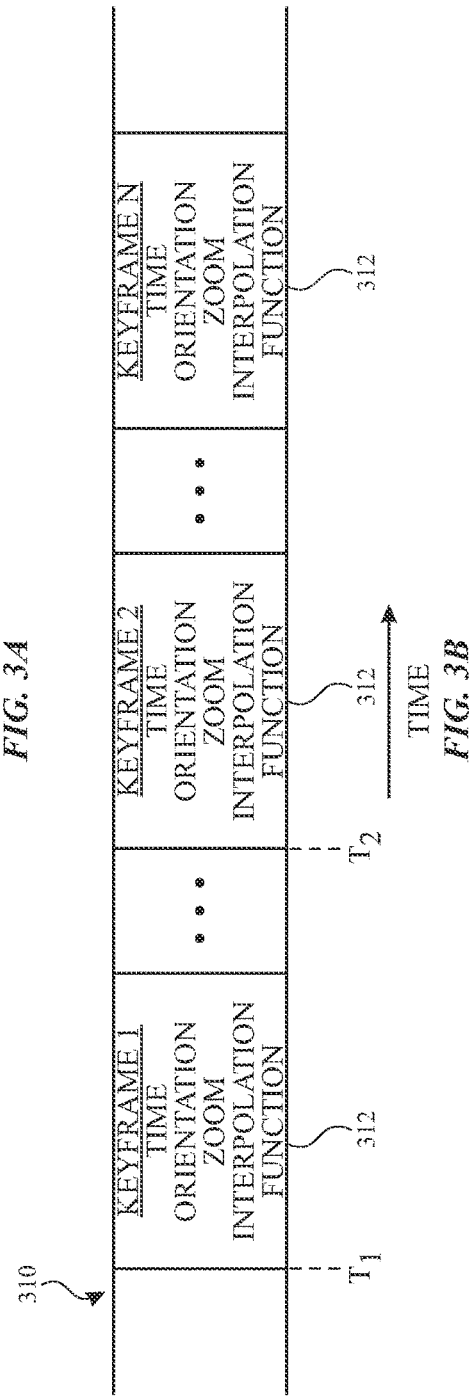

FIGS. 3A-3B illustrate a path between two keyframes of a filmmaker's path (e.g., a transition between a first keyframe and a second keyframe of a sequence of keyframes) according to examples of the disclosure. FIG. 3A illustrates a first viewport 302 of scene 300 for a first keyframe at time T1 and a second viewport 304 of scene 300 for a second keyframe at time T2 of a sequence of keyframes illustrated in timeline 310 in FIG. 3B. Each viewport can represent the portion of scene 300 visible to the viewer of the immersive video in accordance with the selected keyframe.

Timeline 310 represents each keyframe selected by the filmmaker for the duration of the immersive video experience using N keyframes 312. Each keyframe 312 can be associated with timing information, orientation information and/or zoom information. For example, the timing information (e.g., a timing marker) can represent a time in a timeline 310 of the immersive video that is represented in FIG. 3B by the relative position along the time axis. The orientation information can be an orientation of the viewport of camera 306 in the center of scene 300 at a time corresponding to the timing information for the respective keyframe. In some examples, the orientation can be a viewing angle defined in terms of latitude and longitude, quaternion orientation, or in other suitable terms to capture the direction that the camera faces. The zoom information can be a zoom level of the viewport of camera 306 at a time corresponding to the timing information for the respective keyframe. As described herein, the first and second keyframes and the path between keyframes can be selected by the filmmaker using a transition function that can include a linear interpolation, quadratic easing function, or other suitable transition functions. In some examples, the transition function can be associated with a keyframe (e.g., as represented by the "interpolation function" illustrated with each keyframe 312 in timeline 310) and can represent the transition function used for the transition to the associated keyframe from a prior keyframe or user-adjusted viewport. A media player configured for playback of immersive video experiences can use the keyframes and associated information to playback the immersive video from the filmmaker's perspective.

FIG. 3A represents the path between the first keyframe and the second keyframe in terms of a change in orientation (e.g., change in latitude and longitude) of the lens of camera 306 shown by transition curve 308. Although not shown in FIG. 3A, the path between the two keyframes can also include a change in the position of camera 306 within scene 300 and/or include a change in the amount of zoom of camera 306. Although only one path is shown between two keyframes in FIG. 3A, it should be understood that transitions can be selected by the filmmaker to occur between each pair of keyframes in timeline 310.

Figure 4:
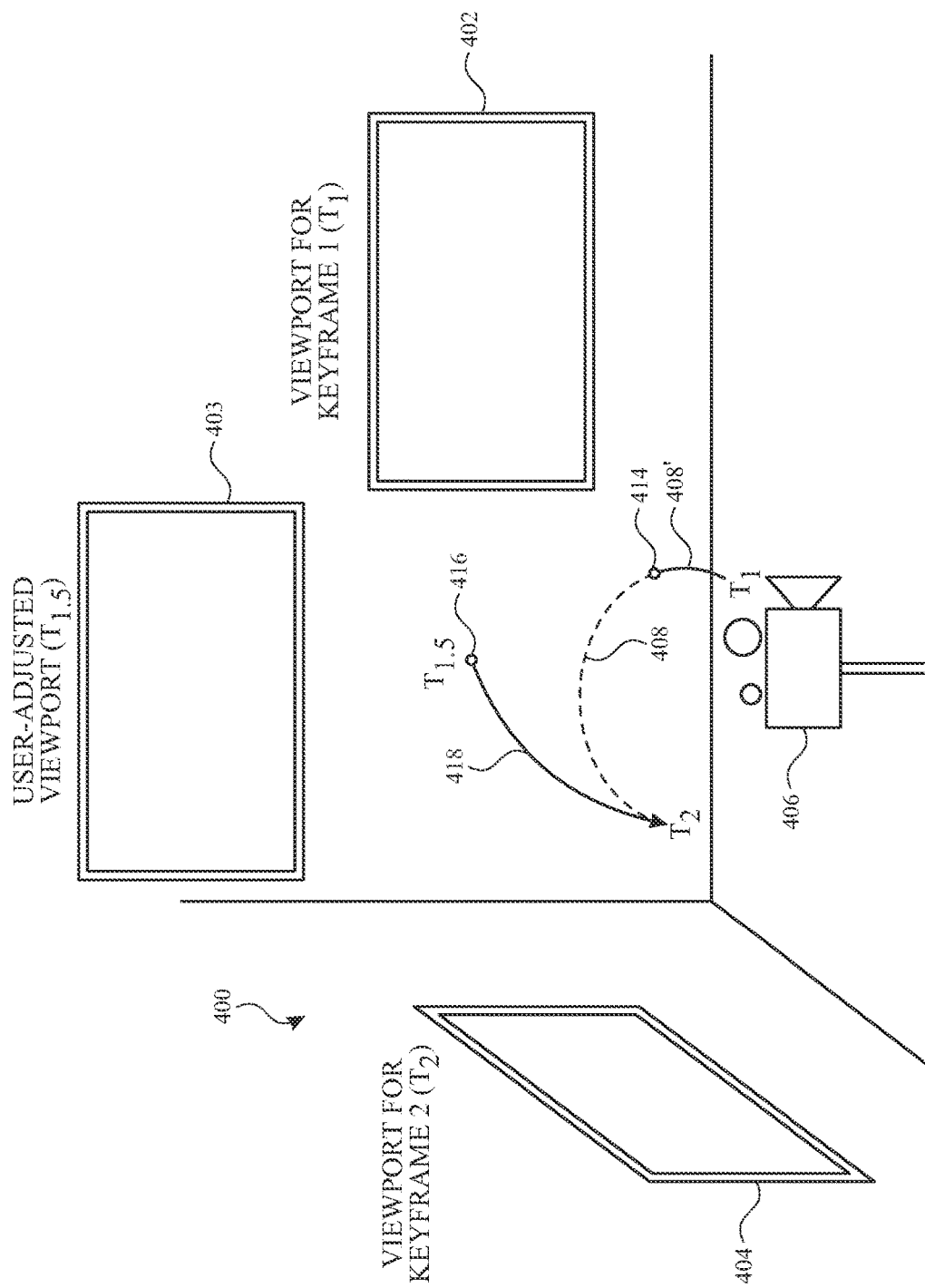
FIG. 4 illustrates a transition between a first keyframe and a second keyframe of a sequence of keyframes including a viewer adjustment according to examples of the disclosure.

FIG. 4 illustrates a path between two keyframes of a filmmaker's path (e.g., a transition between a first keyframe and a second keyframe of a sequence of keyframes) and including a viewer adjustment according to examples of the disclosure. FIG. 4 illustrates a first viewport 402 of scene 400 for a first keyframe at time T1 and a second viewport 404 of scene 400 for a second keyframe at time T2 of a sequence of keyframes (e.g., corresponding to viewports 302 and 304). Without viewer input to adjust the viewport, the path between the first keyframe and the second keyframe would follow transition curve 408 (corresponding to transition curve 308) between times T1 and T2. However, as represented in FIG. 4, while moving between the first keyframe and the second keyframe, one or more viewer inputs can be received requesting to change the viewport for the immersive video to depart from the viewport as defined by the transition curve 408 between the first keyframe the second keyframe (e.g., changing the orientation and/or zoom of the viewport). The start of the viewer input can be represented by circle 414 along transition curve 408 after completing segment 408' of transition curve 408. The one or more viewer inputs can cause a transitioning of the viewport for the immersive video to an updated viewport in accordance with the one or more inputs. FIG. 4 illustrates a user-adjusted viewport 403 of scene 400 at time T1.5. The user-adjusted viewport 403 can represent a departure from the filmmaker-selected keyframes and/or the path therebetween defined by the predefined transition between the two keyframes. The user-adjusted viewport 403 can have a different orientation and/or zoom than viewports 402 and 404 (or the orientation and/or zoom defined by the transition therebetween).

After transitioning the viewport for the immersive video from the viewport as defined by the path between the first keyframe and the second keyframe to the user-adjusted viewport 403, the system can automatically transition from the user-adjusted viewport 403 back to the filmmaker's defined path (e.g., to the orientation defined by one of the keyframes following the first keyframe as defined by the filmmaker). For example, as illustrated by transition curve 418, the transition can be interpolation between the user-adjusted viewport 403 and viewport 404, with the start of the transition represented by circle 416. In some examples, the path represented by transition curve 418 can occur at the conclusion of the user input (e.g., in response to ceasing receiving the one or more inputs requesting to change the viewport for the immersive video). In some examples, the transition back to the filmmaker's path can factor in any remaining momentum in the user-controlled path. In some examples, the transition represented by transition curve 418 can occur with some delay (e.g., a threshold period of time) after the conclusion of the user input. The delay can provide time for the conclusion of the updating of the viewport in accordance with the user input and/or to avoid a negative user experience of the viewport "fighting" the user input by immediately transitioning away from the viewport dictated by the user input. In some examples, the transition represented by transition curve 418 can occur in response to a further user input (e.g., a user input requesting to resume filmmaker control of the video) rather than automatically. In some examples, a user may use an input to freeze the viewport without returning to the filmmaker's determined viewport, which can be reversed by a user input to resume filmmaker control. In some examples, the return from the user's selected viewport back to the filmmaker's path may avoid pre-defined regions, such as the sky, the ceiling or the ground, to lend the transition greater naturalism.

In some examples, the transition between the viewer-influenced perspective and the filmmaker's perspective (e.g., between the user-adjusted viewport and the next viewport corresponding to a filmmaker's keyframe) can rely on a transition function optimized for improved user experience (e.g., to provide a pleasant user experience with graceful transition that feels aesthetically and visually pleasing to the user and without disorienting the user). The transition functions can be predefined or dynamic to optimize the user experience.

In some examples, transition curve 418 can represent a transition according to a filmmaker defined transition function. For example, the transition between viewport 403 and viewport 404 can be in accordance with a filmmaker's predetermined interpolation function. For example, the filmmaker's predetermined interpolation function can be the transition function associated with the director's path (e.g., as represented in FIGS. 3A-3B with the path to the second keyframe), that can be modified based on the change in the timing, orientation and/or zoom level due to the viewer input to adjust the viewport to the user-adjusted viewport 403. In some examples, interpolation can be spherical in nature, such as a spherical linear interpolation (SLERP), calculating the shortest rotational path between the user's viewport and the director's viewport.

In some examples, the transitioning between viewport 403 and viewport 404 can be in accordance with an interpolation function based on the distance between viewport 403 and viewport 404. For example, short distances between viewport 403 and viewport 404 may be result in a first transition function (e.g., a spherical interpolation) whereas longer distances between viewport 403 and viewport 404 may result in a second, different transition function (e.g., a quadratic easing function of second order or higher order). The distance can be measured with reference to a difference in the orientation (e.g., quaternion orientation) and/or the difference in zoom amount. Additionally or alternatively, the distance can be measured with reference to a difference in position of camera 406 within scene 400.

In some examples, the transition between viewport 403 and viewport 404 can be in accordance a duration remaining relative to the timing information associated with one of the plurality of keyframes following the first keyframe (e.g., depending on the duration available for the transition). For example, longer durations in time before T2 for the transition between viewport 403 and viewport 404 may be result in a first transition function (e.g., a spherical linear interpolation), whereas shorter durations for the transition between viewport 403 and viewport 404 may result in a second transition function (e.g., a quadratic easing function of second order or higher order).

In some examples, the transition from viewport 403 to viewport 404 can be dynamically selected for a visually appealing transition that takes into account a predetermined transition function (e.g., a filmmaker's selection), the distance and/or the duration.

In some examples, there may be insufficient time to complete the transition between the user-adjusted viewport and the viewport for the next keyframe defined by the filmmaker in an acceptable manner (e.g., a graceful transition that feels aesthetically and visually pleasing to the user and without disorienting the user). In some examples, when there is insufficient time, the system can transition to a subsequent keyframe (e.g., a third keyframe after the first and second keyframes). In some examples, when there is insufficient time, the system can begin transitioning to the viewport of the next keyframe without completing the transition, and then begin transitioning to a subsequent keyframe (e.g., beginning without completing the transition to the second keyframe and then transitioning to the third keyframe). In some examples, when there is insufficient time, the system can transition to the second keyframe and apply a delay to the timing information of the second keyframe so that the transition is completed at a time later than specified by the filmmaker. In some examples, insufficient time can refer to an attempt to return to the next keyframe defined by the filmmaker beginning within a threshold time from the timing information associated with the next keyframe. In some examples, insufficient time can refer to circumstances in which a transition speed is above a threshold.

Figure 5:
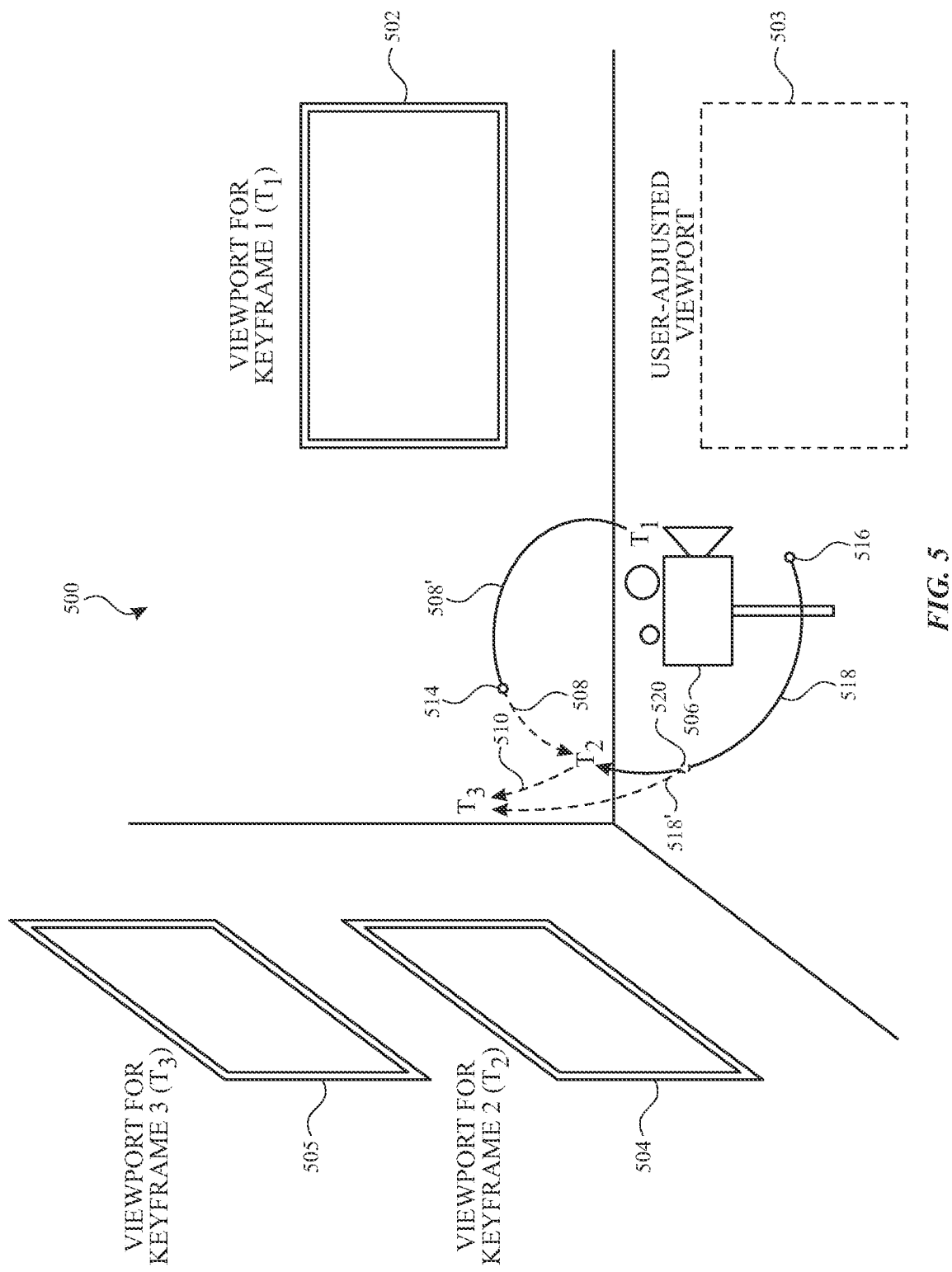
FIG. 5 illustrates a transition between a first keyframe, a second keyframe, and a third keyframe of a sequence of keyframes including a viewer adjustment according to examples of the disclosure.

FIG. 5 illustrates paths between multiple keyframes of a filmmaker's path (e.g., a transition between a first keyframe, a second keyframe, and a third keyframe of a sequence of keyframes) including a viewer adjustment according to examples of the disclosure. FIG. 5 illustrates a first viewport 502 of scene 500 for a first keyframe at time T1, a second viewport 504 of scene 500 for a second keyframe at time T2, and a third viewport 505 of scene 500 for a third keyframe at time T3 of a sequence of keyframes (e.g., with viewports 502 and 504 corresponding to viewports 302/402 and 304/404). Without viewer input to adjust the viewport, the path between the first keyframe and the second keyframe would follow transition curve 508 (corresponding to transition curve 308/408) between times T1 and T2, and the path between the second keyframe and the third keyframe would follow transition curve 510 between times T2 and T3. However, in FIG. 5, while transitioning between the first keyframe and the second keyframe, one or more viewer inputs can be received (e.g., using one or more input devices) requesting to change the viewport for the immersive video to depart from the viewport as defined by the transition curve 508 between the first keyframe the second keyframe. The start of the viewer input can be represented by circle 514 along transition curve 508 after completing segment 508' of transition curve 508. The one or more viewer inputs can cause a transitioning of the viewport for the immersive video to an updated viewport in accordance with the one or more inputs. FIG. 5 illustrates a user-adjusted viewport 503 of scene 500 at time T1.5. The user-adjusted viewport 503 can represent a departure from the filmmaker selected keyframes or the path therebetween defined by the predefined transition between the two. The user-adjusted viewport 503 can have a different orientation and/or zoom than viewports 502 and 504 (or the orientation and/or zoom defined by the transition therebetween).

After transitioning the viewport for the immersive video from the viewport as defined by the transition between the first keyframe and the second keyframe to the user-adjusted viewport 503, the system can automatically transition from the user-adjusted viewport 503 to the viewport defined by one of the keyframes following the first keyframe. For example, as illustrated by transition curve 518, the transition can be between the user-adjusted viewport 503 and viewport 504, with the start of the transition represented by circle 516 in a similar manner as the transition described with respect to FIG. 4 (e.g., when there is sufficient time to complete the transition to viewport 504 according to its associated timing information at T2). In such an example, the system can later transition to viewport 505 in accordance with the filmmaker's perspective as represented by transition curve 510 between T2 and T3.

In some examples, when conditions do not permit a graceful transition from the user-adjusted viewport 503 to the next viewport 504, the system can automatically transition from the user-adjusted viewport 503 to the viewport defined by a different point along the filmmaker's path (e.g., a subsequent keyframe) different than viewport 504. For example, as illustrated by transition curve 518', the transition can be between the user-adjusted viewport 503 and viewport 505, with the start of the transition represented by circle 516 and the end of the transition with viewport 505 at time T3. The additional time provided by transitioning to viewport 505 and skipping viewport 504 can allow for a graceful transition between viewport 503 back to the filmmaker's perspective. In some such examples, the transition can begin between the user-adjusted viewport 503 toward viewport 504 as illustrated by transition curve 518 prior to circle 520 (without completing the transition to the second keyframe), and then the transition can continue along the transition curve 518 to viewport 505, with the start of second leg of the transition being represented by circle 520 and the end of the transition with viewport 505 at time T3.

In some examples, when conditions do not permit a graceful transition from the user-adjusted viewport 503 to the next viewport 504 in accordance with the timing information for the second keyframe (at T2), the system can automatically update the timing information associated with the second keyframe to allow for a graceful transition from the user-adjusted viewport 503 to viewport 504. For example, a delay can be added to the timing information so that the transition can be between the user-adjusted viewport 503 and viewport 504 (as illustrated by transition curve 518), but arriving at viewport 504 at a time of T2+ΔT, where ΔT represents a delay. In some examples, the delay can be constrained by a maximum delay to avoid interfering with a graceful transition between the second keyframe and the third keyframe (as represented by transition curve 510).

Although returning from a user-adjusted viewport to the filmmaker's path is often described herein with reference to the keyframe location and/or timing to a subsequent keyframe, it is understood that in some examples, returning from the user-adjusted viewport to the filmmaker's path is simply achieved by interpolating between the user's viewport and the filmmaker's defined path, regardless of keyframe locations/timing.

Figure 6:
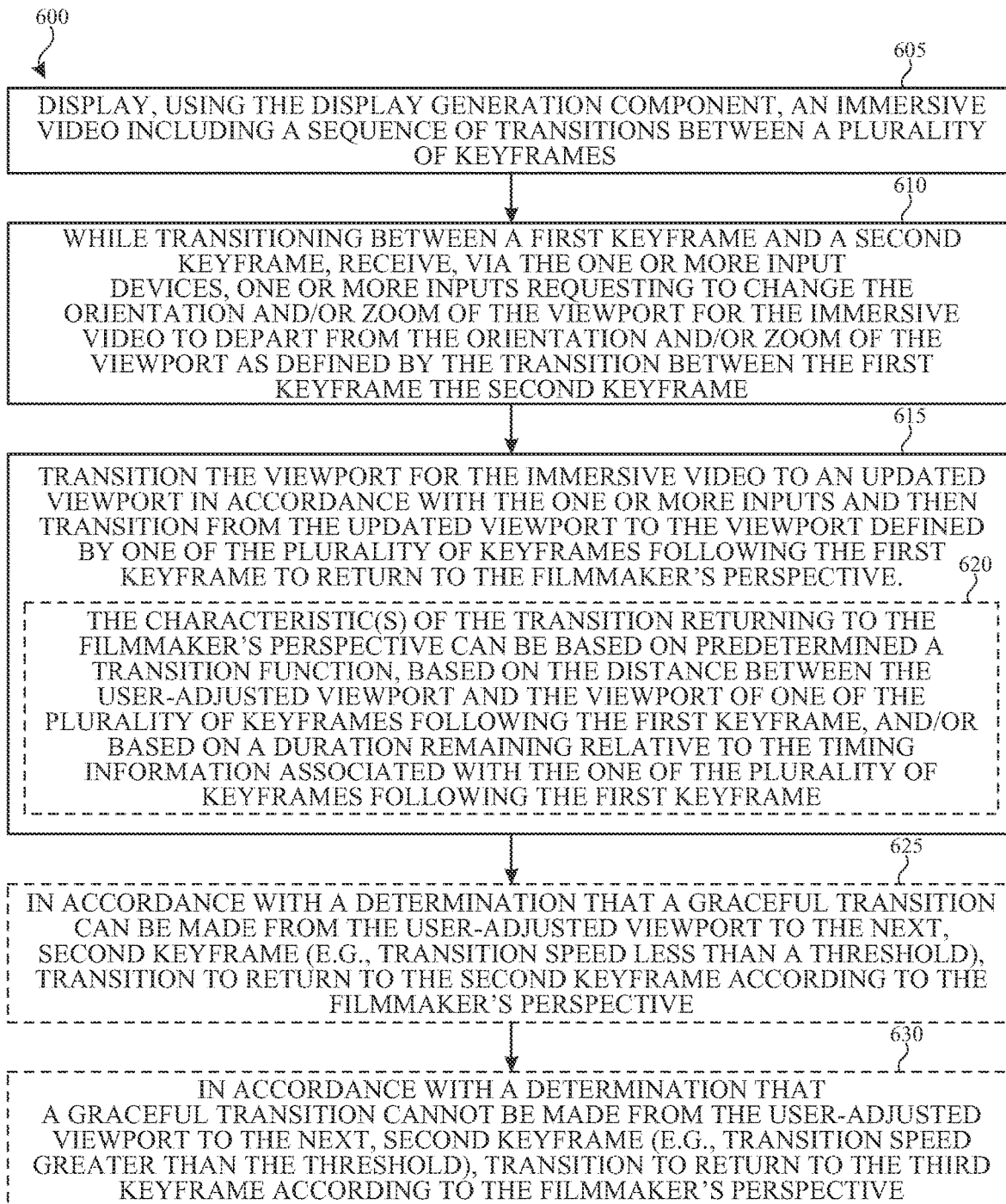
FIG. 6 illustrates an example process for transitioning between viewports according to examples of the disclosure.

FIG. 6 illustrates an example process 600 for transitioning between viewports according to examples of the disclosure. Process 600 can be performed at an electronic device in communication with a display generation component and one or more input devices (e.g., data processing system 200 of FIG. 2). At 605, the device can display, using the display generation component, an immersive video including a sequence of transitions between a plurality of keyframes (e.g., defining a filmmaker's perspective/path for the immersive video). As described herein, a respective keyframe can be associated with timing information and orientation information defining an orientation of a viewport for the immersive video at a time corresponding to the timing information. Additionally or alternatively, the respective keyframe can be associated with zoom information defining an amount of zoom of the viewport for the immersive video at a time corresponding to the timing information. Without user input, the immersive video experience can be performed entirely from the filmmaker's perspective and using the filmmaker's path (e.g., the filmmaker's selection of transitions between the keyframes).

In some examples, at 610, while transitioning between a first keyframe and a second keyframe, the device can receive, via the one or more input devices, one or more inputs requesting to change the orientation and/or zoom of the viewport for the immersive video to depart from the orientation and/or zoom of the viewport as defined by the transition between the first keyframe the second keyframe. At 615, the device can transition the viewport for the immersive video to an updated viewport in accordance with the one or more inputs (updating the orientation and/or zoom). Additionally, after transitioning the viewport for the immersive video from the viewport as defined by the transition between the first keyframe and the second keyframe to the updated viewport, the device can transition (e.g., automatically) from the updated viewport to the path representing the filmmaker's perspective (e.g., to the viewport defined by one of the plurality of keyframes following the first keyframe or any point along the filmmaker's path). The transition returning back to the filmmaker's perspective can begin in response to the conclusion of the user input requesting to change the viewport, optionally with a delay.

In some examples, at 620, the characteristic(s) of the transition returning to the filmmaker's perspective can be based on predetermined a transition function (e.g., linear interpolation function, quadratic easing function, etc.), based on the distance between the user-adjusted viewport and a point on the filmmaker's defined path (e.g., optionally based on the distance between the user-adjusted viewport and the viewport of one of the plurality of keyframes following the first keyframe, and/or based on a duration remaining relative to the timing information associated with the one of the plurality of keyframes following the first keyframe). In some examples, the characteristics of the transition returning to the filmmaker's perspective can also be based on the user input (e.g., the number of fingers used for an input gesture) or characteristics of the user input (e.g., velocity of the finger(s) upon liftoff).

In some examples, at 625, in accordance with a determination that a graceful transition can be made from the user-adjusted viewport to the next, second keyframe, the transition can be performed to return to the path representing the filmmaker's perspective (e.g., the second keyframe defined by the filmmaker). In some examples, at 630, in accordance with a determination that a graceful transition cannot be made from the user-adjusted viewport to the next, second keyframe, the transition can be performed to return to the third keyframe according to the filmmaker's perspective. In some examples, the determination that a graceful transition can or cannot be made can be dependent on the distance and duration for the transition. In some examples, the determination that a graceful transition can or cannot be made can be dependent on the transition speed (e.g., transition distance divided by the duration for the transition). For example, in accordance with a determination that an estimated transition speed between the user-adjusted viewport and the viewport of the second keyframe is less than a threshold speed, the device can transition from the user-adjusted viewport to the second viewport defined by the second keyframe, and in accordance with a determination that the estimated transition speed between the user-adjusted viewport and the viewport of the second keyframe greater than the threshold speed, the device can transition from the user-adjusted viewport to the third viewport defined by the third keyframe.

It should be understood that in some examples, process 600 can be performed by a media player application configured to interpret data for an immersive video experience. For example, the data can be a file (e.g., JSON) that can include information regarding the 360° video, keyframes and associated keyframe settings (e.g., camera position in the scene, camera orientation, camera zoom), and transition functions. In some examples, the file can be created using a content authoring tool in which a filmmaker can select keyframes and manipulate timing functions using a timing function editor to select transitions between keyframes.

Additionally, it should be understood that although primarily described and illustrated in terms of the orientation of the viewport, that the keyframes and transitions can also include information about zoom and/or camera position within the scene to interpolate between different camera orientation, zoom and position between keyframes. Additionally, it should be understood that although primarily described in terms of immersive 360° video, that the use of keyframes and transitions could also be used for directed web experiences (e.g., a two-dimensional web experience, in which a user can be guided through website content, such as showing certain features of a product or assisting in filling out a form).

Therefore, according to the above, some examples of the disclosure are directed to a method. In some examples, the method can be performed at an electronic device in communication with a display generation component (e.g., display device 223) and one or more input devices (e.g., I/O device(s) 217). The method can comprise: displaying, using the display generation component, an immersive video including a sequence of transitions between a plurality of keyframes, each keyframe associated with timing information and orientation information defining an orientation of a viewport for the immersive video, the plurality of keyframes including a first keyframe and a second keyframe; while transitioning between the first keyframe and the second keyframe, receiving, via the one or more input devices, one or more inputs requesting to change the orientation of viewport for the immersive video to depart from the orientation of the viewport as defined by the transition between the first keyframe the second keyframe; transitioning the orientation of the viewport for the immersive video to an updated orientation in accordance with the one or more inputs; and after transitioning the orientation of the viewport for the immersive video from the orientation of the viewport as defined by the transition between the first keyframe and the second keyframe to the updated orientation, transitioning from the updated orientation to the orientation defined by one of the plurality of keyframes following the first keyframe. Additionally or alternatively to one or more of the examples disclosed above, in some examples, transitioning from the updated orientation to the orientation defined by the one of the plurality of keyframes following the first keyframe can occur in response to ceasing receiving the one or more inputs requesting to change the orientation of viewport for the immersive video. Additionally or alternatively to one or more of the examples disclosed above, in some examples, transitioning from the updated orientation to the orientation defined by the one of the plurality of keyframes following the first keyframe can occur a threshold time after ceasing receiving the one or more inputs requesting to change the orientation of viewport for the immersive video. Additionally or alternatively to one or more of the examples disclosed above, in some examples, transitioning from the updated orientation to the orientation defined by the one of the plurality of keyframes following the first keyframe can comprise transitioning between the updated orientation to the orientation defined by the one of the plurality of keyframes in accordance with a predetermined interpolation function. Additionally or alternatively to one or more of the examples disclosed above, in some examples, transitioning from the updated orientation to the orientation defined by the one of the plurality of keyframes following the first keyframe can comprise transitioning in accordance with an interpolation function based on the distance between the updated orientation and the orientation defined by the one of the plurality of keyframes following the first keyframe. Additionally or alternatively to one or more of the examples disclosed above, in some examples, transitioning from the updated orientation to the orientation defined by the one of the plurality of keyframes following the first keyframe can comprise transitioning in accordance with an interpolation function based on a duration remaining relative to the timing information associated with the one of the plurality of keyframes following the first keyframe. Additionally or alternatively to one or more of the examples disclosed above, in some examples, the transitioning from the updated orientation to the orientation defined by the one of the plurality of keyframes following the first keyframe can comprise a transition based on a quadratic easing function of at least a second order. Additionally or alternatively to one or more of the examples disclosed above, in some examples, transitioning from the updated orientation to the orientation defined by the one of the plurality of keyframes following the first keyframe can comprise: in accordance with a determination that an estimated transition speed between the updated orientation and the orientation defined by the second keyframe is less than a threshold speed, transitioning from the updated orientation to the orientation defined by the second keyframe; and in accordance with a determination that the estimated transition speed between the updated orientation and the orientation defined by the second keyframe is greater than the threshold speed, transitioning from the updated orientation to the orientation defined by a third keyframe of the plurality of keyframes following the second keyframe. Additionally or alternatively to one or more of the examples disclosed above, in some examples, transitioning from the updated orientation to the orientation defined by the one of the plurality of keyframes following the first keyframe can comprise: in accordance with a determination that an estimated transition speed between the updated orientation and the orientation defined by the second keyframe is less than a threshold speed, transitioning from the updated orientation to the orientation defined by the second keyframe in accordance with the timing information associated with the second keyframe; and in accordance with a determination that the estimated transition speed between the updated orientation and the orientation defined by the second keyframe is greater than the threshold speed, applying a delay to the timing information associated with the second keyframe and transitioning from the updated orientation to the orientation defined by the second keyframe. Additionally or alternatively to one or more of the examples disclosed above, in some examples, one or more of the plurality of keyframes can be associated with zoom information defining an amount of zoom of the viewport for the immersive video and the one or more inputs further requesting to change the amount of zoom of the viewport for the immersive video as defined by the transition between the first keyframe the second keyframe. The method can further comprise: transitioning the amount of zoom of the viewport for the immersive video to an updated amount of zoom in accordance with the one or more inputs; and after transitioning the amount of zoom of the viewport for the immersive video to the updated amount of zoom, transitioning from the updated amount of zoom to the amount of zoom defined by one of the plurality of keyframes following the first keyframe. Additionally or alternatively to one or more of the examples disclosed above, in some examples, transitioning from the updated orientation to the orientation defined by the one of the plurality of keyframes following the first keyframe can comprise avoiding orienting the viewport for the immersive video in a predefined orientation (e.g., avoiding the sky, or ceiling or ground). Some examples of the disclosure are directed to a non-transitory computer readable storage medium. The non-transitory computer readable storage medium can store instructions, which when executed by a device including a display generation component, one or more input devices, and one or more processors, can cause the device to perform any of the above methods.

Some examples of the disclosure are directed to a system. In some examples, the system can comprise a display generation component (e.g., display device 223) and one or more input devices (e.g., I/O devices 217). In some examples, the system can comprise one or more processors. The one or more processors can be configured to display, using a display generation component, an immersive video including a sequence of transitions between a plurality of keyframes, each keyframe associated with timing information and orientation information defining an orientation of a viewport for the immersive video, the plurality of keyframes including a first keyframe and a second keyframe; while transitioning between the first keyframe and the second keyframe, receive, via the one or more input devices, one or more inputs requesting to change the orientation of viewport for the immersive video to depart from the orientation of the viewport as defined by the transition between the first keyframe the second keyframe; transition the orientation of the viewport for the immersive video to an updated orientation in accordance with the one or more inputs; and after transitioning the orientation of the viewport for the immersive video from the orientation of the viewport as defined by the transition between the first keyframe and the second keyframe to the updated orientation, transition from the updated orientation to the orientation defined by one of the plurality of keyframes following the first keyframe. Additionally or alternatively to one or more of the examples disclosed above, in some examples, transitioning from the updated orientation to the orientation defined by the one of the plurality of keyframes following the first keyframe can occur in response to ceasing receiving the one or more inputs requesting to change the orientation of viewport for the immersive video. Additionally or alternatively to one or more of the examples disclosed above, in some examples, transitioning from the updated orientation to the orientation defined by the one of the plurality of keyframes following the first keyframe can occur a threshold time after ceasing receiving the one or more inputs requesting to change the orientation of viewport for the immersive video. Additionally or alternatively to one or more of the examples disclosed above, in some examples, transitioning from the updated orientation to the orientation defined by the one of the plurality of keyframes following the first keyframe can comprise transitioning between the updated orientation to the orientation defined by the one of the plurality of keyframes in accordance with a predetermined interpolation function. Additionally or alternatively to one or more of the examples disclosed above, in some examples, transitioning from the updated orientation to the orientation defined by the one of the plurality of keyframes following the first keyframe can comprise transitioning in accordance with an interpolation function based on the distance between the updated orientation and the orientation defined by the one of the plurality of keyframes following the first keyframe. Additionally or alternatively to one or more of the examples disclosed above, in some examples, transitioning from the updated orientation to the orientation defined by the one of the plurality of keyframes following the first keyframe can comprise transitioning in accordance with an interpolation function based on a duration remaining relative to the timing information associated with the one of the plurality of keyframes following the first keyframe. Additionally or alternatively to one or more of the examples disclosed above, in some examples, the transitioning from the updated orientation to the orientation defined by the one of the plurality of keyframes following the first keyframe can comprise a transition based on a quadratic easing function of at least a second order. Additionally or alternatively to one or more of the examples disclosed above, in some examples, transitioning from the updated orientation to the orientation defined by the one of the plurality of keyframes following the first keyframe can comprise: in accordance with a determination that an estimated transition speed between the updated orientation and the orientation defined by the second keyframe is less than a threshold speed, transitioning from the updated orientation to the orientation defined by the second keyframe; and in accordance with a determination that the estimated transition speed between the updated orientation and the orientation defined by the second keyframe is greater than the threshold speed, transitioning from the updated orientation to the orientation defined by a third keyframe of the plurality of keyframes following the second keyframe. Additionally or alternatively to one or more of the examples disclosed above, in some examples, transitioning from the updated orientation to the orientation defined by the one of the plurality of keyframes following the first keyframe can comprise: in accordance with a determination that an estimated transition speed between the updated orientation and the orientation defined by the second keyframe is less than a threshold speed, transitioning from the updated orientation to the orientation defined by the second keyframe in accordance with the timing information associated with the second keyframe; and in accordance with a determination that the estimated transition speed between the updated orientation and the orientation defined by the second keyframe is greater than the threshold speed, applying a delay to the timing information associated with the second keyframe and transitioning from the updated orientation to the orientation defined by the second keyframe. Additionally or alternatively to one or more of the examples disclosed above, in some examples, one or more of the plurality of keyframes can be associated with zoom information defining an amount of zoom of the viewport for the immersive video and the one or more inputs further requesting to change the amount of zoom of the viewport for the immersive video as defined by the transition between the first keyframe the second keyframe. The one or more processors can be further configured to: transition the amount of zoom of the viewport for the immersive video to an updated amount of zoom in accordance with the one or more inputs; and after transitioning the amount of zoom of the viewport for the immersive video to the updated amount of zoom, transition from the updated amount of zoom to the amount of zoom defined by one of the plurality of keyframes following the first keyframe. Additionally or alternatively to one or more of the examples disclosed above, in some examples, transitioning from the updated orientation to the orientation defined by the one of the plurality of keyframes following the first keyframe can comprise avoiding orienting the viewport for the immersive video in a predefined orientation (e.g., avoiding the sky, or ceiling or ground).

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A method comprising:
   at an electronic device in communication with a display and one or more input devices:
      displaying, using the display, an immersive video including a sequence of transitions between a plurality of keyframes, wherein:
         a keyframe of the plurality of keyframes is associated with timing information and orientation information defining an orientation of a viewport for the immersive video for the keyframe,
         the plurality of keyframes includes a first keyframe and a second keyframe, and
         a first predetermined transition of the sequence of transitions defines one or more orientations of the viewport for the immersive video between the first keyframe and the second keyframe, the one or more orientations of the viewport including a first orientation of the viewport for the immersive video between the first keyframe and the second keyframe;
      while transitioning between the first keyframe and the second keyframe in accordance with the first predetermined transition:
         receiving, via the one or more input devices, one or more user inputs requesting to depart from the first orientation of the viewport for the immersive video between the first keyframe and the second keyframe;
      transitioning from the first orientation of the viewport for the immersive video between the first keyframe and the second keyframe to an updated orientation in accordance with the one or more user inputs; and
      after transitioning from the first orientation of the viewport for the immersive video between the first keyframe and the second keyframe to the updated orientation, transitioning from the updated orientation to a second orientation defined by one of the plurality of keyframes following the first keyframe.

2. The method of claim 1, wherein transitioning from the updated orientation to the second orientation defined by the one of the plurality of keyframes following the first keyframe occurs in response to ceasing receiving the one or more user inputs.

3. The method of claim 1, wherein transitioning from the updated orientation to the second orientation defined by the one of the plurality of keyframes following the first keyframe occurs a threshold time after ceasing receiving the one or more user inputs.

4. The method of claim 1, wherein transitioning from the updated orientation to the second orientation defined by the one of the plurality of keyframes following the first keyframe comprises transitioning between the updated orientation to the second orientation defined by the one of the plurality of keyframes in accordance with a predetermined interpolation function.

5. The method of claim 1, wherein transitioning from the updated orientation to the second orientation defined by the one of the plurality of keyframes following the first keyframe comprises transitioning in accordance with an interpolation function based on a distance between the updated orientation and the second orientation defined by the one of the plurality of keyframes following the first keyframe.

6. The method of claim 1, wherein transitioning from the updated orientation to the second orientation defined by the one of the plurality of keyframes following the first keyframe comprises transitioning in accordance with an interpolation function based on a duration remaining relative to the timing information associated with the one of the plurality of keyframes following the first keyframe.

7. The method of claim 1, wherein the transitioning from the updated orientation to the second orientation defined by the one of the plurality of keyframes following the first keyframe comprises a transition based on a quadratic easing function of at least a second order.

8. The method of claim 1, wherein transitioning from the updated orientation to the second orientation defined by the one of the plurality of keyframes following the first keyframe comprises:
in accordance with a determination that an estimated transition speed between the updated orientation and the second orientation defined by the second keyframe is less than a threshold speed, transitioning from the updated orientation to the orientation defined by the second keyframe; and
in accordance with a determination that the estimated transition speed between the updated orientation and the orientation defined by the second keyframe is greater than the threshold speed, transitioning from the updated orientation to the second orientation defined by a third keyframe of the plurality of keyframes following the second keyframe.

9. The method of claim 1, wherein transitioning from the updated orientation to the second orientation defined by the one of the plurality of keyframes following the first keyframe comprises:
in accordance with a determination that an estimated transition speed between the updated orientation and the orientation defined by the second keyframe is less than a threshold speed, transitioning from the updated orientation to the second orientation defined by the second keyframe in accordance with the timing information associated with the second keyframe; and
in accordance with a determination that the estimated transition speed between the updated orientation and the second orientation defined by the second keyframe is greater than the threshold speed, applying a delay to the timing information associated with the second keyframe and transitioning from the updated orientation to the second orientation defined by the second keyframe.

10. The method of claim 1, wherein one or more of the plurality of keyframes is associated with zoom information defining an amount of zoom of the viewport for the immersive video and the one or more user inputs further requesting to change the amount of zoom of the viewport for the immersive video as defined by the transition between the first keyframe the second keyframe, the method further comprising:
transitioning the amount of zoom of the viewport for the immersive video to an updated amount of zoom in accordance with the one or more user inputs; and
after transitioning the amount of zoom of the viewport for the immersive video to the updated amount of zoom, transitioning from the updated amount of zoom to the amount of zoom defined by one of the plurality of keyframes following the first keyframe.

11. The method of claim 1, wherein transitioning from the updated orientation to the second orientation defined by the one of the plurality of keyframes following the first keyframe comprises avoiding orienting the viewport for the immersive video in a predefined orientation.

12. A system comprising:
a display;
one or more input devices:
one or more processors configured to:
display, using the display, an immersive video including a sequence of transitions between a plurality of keyframes, wherein:
a keyframe of the plurality of keyframes is associated with timing information and orientation information defining an orientation of a viewport for the immersive video for the keyframe,
the plurality of keyframes including a first keyframe and a second keyframe, and
a first predetermined transition of the sequence of transitions defines one or more orientations of the viewport for the immersive video between the first keyframe and the second keyframe, the one or more orientations of the viewport including a first orientation of the viewport for the immersive video between the first keyframe and the second keyframe;
while transitioning between the first keyframe and the second keyframe in accordance with the first predetermined transition:
receive, via the one or more input devices, one or more user inputs requesting to depart from the first orientation of the viewport for the immersive video between the first keyframe and the second keyframe;
transition from the first orientation of the viewport for the immersive video between the first keyframe and the second keyframe to an updated orientation in accordance with the one or more user inputs; and
after transitioning from the first orientation of the viewport for the immersive video between the first keyframe and the second keyframe to the updated orientation, transition from the updated orientation to a second orientation defined by one of the plurality of keyframes following the first keyframe.

13. The system of claim 12, wherein transitioning from the updated orientation to the second orientation defined by the one of the plurality of keyframes following the first keyframe occurs in response to ceasing receiving the one or more user inputs.

14. The system of claim 12, wherein transitioning from the updated orientation to the second orientation defined by the one of the plurality of keyframes following the first keyframe occurs a threshold time after ceasing receiving the one or more user inputs.

15. The system of claim 12, wherein transitioning from the updated orientation to the second orientation defined by the one of the plurality of keyframes following the first keyframe comprises transitioning between the updated orientation to the second orientation defined by the one of the plurality of keyframes in accordance with a predetermined interpolation function.

16. The system of claim 12, wherein transitioning from the updated orientation to the second orientation defined by the one of the plurality of keyframes following the first keyframe comprises transitioning in accordance with an interpolation function based on a distance between the updated orientation and the second orientation defined by the one of the plurality of keyframes following the first keyframe.

17. The system of claim 12, wherein transitioning from the updated orientation to the second orientation defined by the one of the plurality of keyframes following the first keyframe comprises transitioning in accordance with an interpolation function based on a duration remaining relative to the timing information associated with the one of the plurality of keyframes following the first keyframe.

18. The system of claim 12, wherein the transitioning from the updated orientation to the second orientation defined by the one of the plurality of keyframes following the first keyframe comprises a transition based on a quadratic easing function of at least a second order.

19. The system of claim 12, wherein transitioning from the updated orientation to the second orientation defined by the one of the plurality of keyframes following the first keyframe comprises:
  in accordance with a determination that an estimated transition speed between the updated orientation and the second orientation defined by the second keyframe is less than a threshold speed, transitioning from the updated orientation to the second orientation defined by the second keyframe; and
  in accordance with a determination that the estimated transition speed between the updated orientation and the second orientation defined by the second keyframe is greater than the threshold speed, transitioning from the updated orientation to the second orientation defined by a third keyframe of the plurality of keyframes following the second keyframe.

20. A non-transitory computer readable storage medium storing instructions, which when executed by an electronic device including a display, one or more input devices, and one or more processors, cause the electronic device to:
  display, using the display, an immersive video including a sequence of transitions between a plurality of keyframes, wherein:
    a keyframe of the plurality of keyframes is associated with timing information and zoom information defining an amount of zoom of a viewport for the immersive video for the keyframe,
    the plurality of keyframes including a first keyframe and a second keyframe, and
    a first predetermined transition of the sequence of transitions defines one or more amounts of zoom of the viewport for the immersive video between the first keyframe and the second keyframe, the one or more amounts of zoom of the viewport including a first amount of zoom of the viewport for the immersive video between the first keyframe and the second keyframe;
  while transitioning between the first keyframe and the second keyframe in accordance with the first predetermined transition:
    receive, via the one or more input devices, one or more user inputs requesting to depart from the first amount of zoom of the viewport for the immersive video between the first keyframe and the second keyframe;
    transition from the first amount of zoom of the viewport for the immersive video between the first keyframe and the second keyframe to an updated amount of zoom in accordance with the one or more user inputs; and
    after transitioning from the first amount of zoom of the viewport for the immersive video between the first keyframe and the second keyframe to the updated amount of zoom, transition from the updated amount of zoom to a second amount of zoom defined by one of the plurality of keyframes following the first keyframe.

21. The non-transitory computer readable storage medium of claim 20, wherein transitioning from the updated amount of zoom to the second amount of zoom defined by the one of the plurality of keyframes following the first keyframe occurs in response to ceasing receiving the one or more user inputs.

22. The non-transitory computer readable storage medium of claim 20, wherein transitioning from the updated amount of zoom to the second amount of zoom defined by the one of the plurality of keyframes following the first keyframe occurs a threshold time after ceasing receiving the one or more inputs.

23. The non-transitory computer readable storage medium of claim 20, wherein transitioning from the updated amount of zoom to the second amount of zoom defined by the one of the plurality of keyframes following the first keyframe comprises transitioning between the updated amount of zoom to the second amount of zoom defined by the one of the plurality of keyframes in accordance with a predetermined interpolation function.

24. The non-transitory computer readable storage medium of claim 20, wherein transitioning from the updated amount of zoom to the second amount of zoom defined by the one of the plurality of keyframes following the first keyframe comprises transitioning in accordance with an interpolation function based on a duration remaining relative to the timing information associated with the one of the plurality of keyframes following the first keyframe.

25. The non-transitory computer readable storage medium of claim 20, wherein:
  the keyframe of the plurality of keyframes is associated with orientation information defining an orientation of the viewport for the immersive video for the keyframe,
  the first predetermined transition defines one or more orientations of the viewport for the immersive video between the first keyframe and the second keyframe, including a first orientation,
  the one or more user inputs further requesting to depart from the first orientation of the viewport for the immersive video as defined by the first predetermined transition between the first keyframe the second keyframe, and
  the instructions, when executed by the electronic device, cause the electronic device to:
    transition from the first orientation of the viewport for the immersive video between the first keyframe and the second keyframe to an updated orientation in accordance with the one or more user inputs; and
    after transitioning from the first orientation of the viewport for the immersive video between the first keyframe and the second keyframe to the updated orientation, transition from the updated orientation to a second orientation defined by the one of the plurality of keyframes following the first keyframe.

* * * * *